Oct. 7, 1958

E. B. THAXTON 2,855,003

PIPE STOPPERS

Filed Jan. 11, 1956

INVENTOR.
ELLIS B. THAXTON
BY
*[signature]*
ATTORNEY

Oct. 7, 1958     E. B. THAXTON     2,855,003
PIPE STOPPERS

Filed Jan. 11, 1956     2 Sheets-Sheet 2

INVENTOR.
ELLIS B. THAXTON
BY
ATTORNEY

United States Patent Office 2,855,003
Patented Oct. 7, 1958

2,855,003

PIPE STOPPERS

Ellis B. Thaxton, Grand Prairie, Tex.

Application January 11, 1956, Serial No. 558,512

6 Claims. (Cl. 138—90)

This invention relates to pipe closures frequently referred to as pipe stoppers, one use of which to be herein more particularly described is for the closing of the ends of pipe or other open pipe-like openings.

My present invention has for its novel features improvements over my co-pending application Serial Number 435,720, filed June 10, 1954, which will be readily understood by those skilled in the art from the following description, together with the accompanying drawings, in which.

Figure 1:
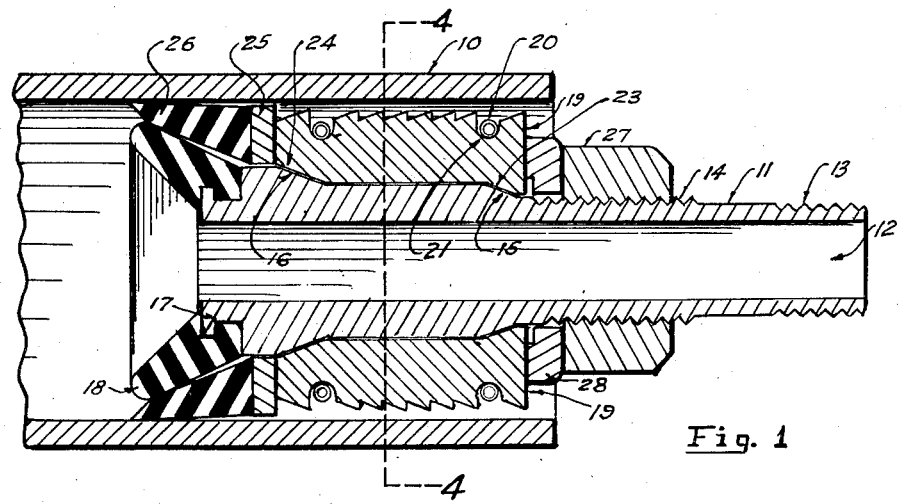
Figure 1 shows my invention in place within an associated pipe.

In the several figures like references indicate similar parts, wherein 10 is a section of pipe to be closed, 11 is a mandrel having an opening 12 therethrough, exteriorally threaded sections 13 and 14, also beveled faced enlarged sections 15 and 16, and an end portion 17 adapted to operably receive and engage a rubber-like member 18 for purposes later to be described more fully.

About mandrel 11 are assembled a desired multiple number of pipe-engaging slips 19 which are retained in assembled relation by tensioned coil springs 20 encircling the assembly and secured against dislodgment by being received in recessed grooves 21 in the faces of the slips. Slips 21 are provided with projections or teeth 22 so formed as to provide a maximum engagement with the inner wall of the pipe during operation of the invention. Slips 21 also have beveled inner sections 23 and 24 adapted to function cooperatively with beveled sections 15 and 16 respectively of mandrel 11 during operation of the invention.

A rigid or metal ring 25 may have rubber seal 26 bonded thereto or otherwise associated therewith as desired. The inner diameter of ring 25 is large enough to be passed freely over the largest section of mandrel 11, while the inner surface of seal 26 is formed at an angle to cooperate with a similar outer surface of rubber member 18. Rubber member 18 and seal 26 may be of the same or varying hardness as desired. A nut 27 is threadedly engaged with threaded section 14 of mandrel 11 while a bearing ring 28 may be interposed between the nut 27 and slips 19 in a preferred form of construction.

Figure 2:
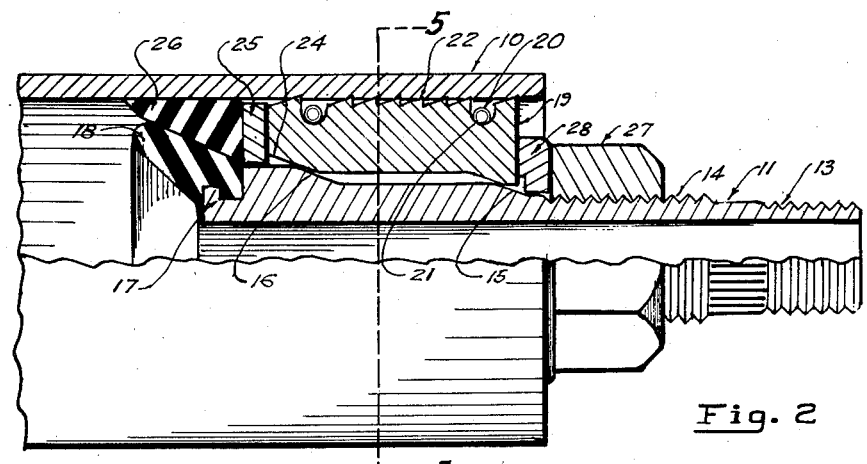
Figure 2 shows the apparatus of Figure 1 engaged operably with the pipe section.
Figure 4:
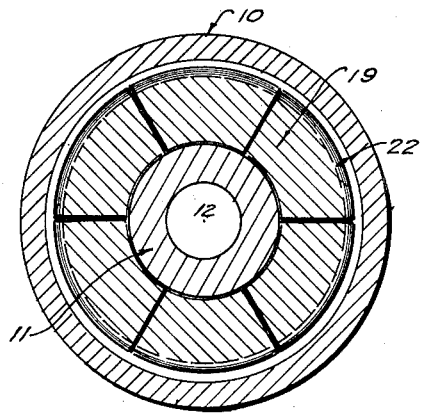
Figure 4 is a section along line 4—4 of Figure 1.
Figure 5:
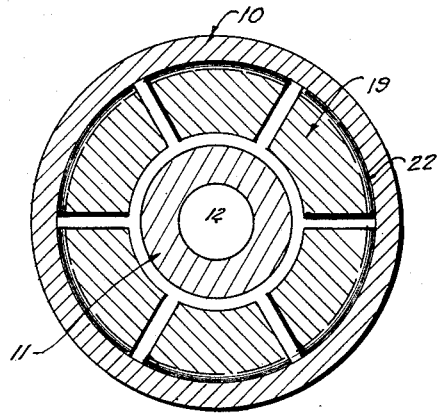
Figure 5 is a section along line 5—5 of Figure 2.

The operation is as follows: Over mandrel 11, which has bonded thereto rubber section 18, there is passed rubber seal 26 and ring 25. Slips 19 are then assembled about mandrel 11 and retained by coil springs 20 under tension. Bearing ring 28 is passed into position against slips 19 and nut 27 is threaded onto section 14 of the mandrel 11 and the entire assembly passed into the pipe which is to be stopped or closed as shown in Figures 1 and 4. It may be noted that seal 26 may be slightly larger than the inside diameter of pipe 10 but due to its resiliency may readily be passed into the pipe. Nut 27 is turned and progresses forward thrusting bearing ring 28 against slips 19 causing their beveled surfaces 23—24 co-acting with beveled surfaces 15—16 of the mandrel to cause the slips to move outwardly and engage teeth 22 with the inner wall of the pipe 10 as desired, while the mating surfaces of rubber elements 18 and 26 have co-acted to expand and impact seal member 26 against ring 25 and the inner surface of pipe 10. The position of the parts will now be as indicated in Figures 2 and 5 whereupon any suitable medium such as water or air may be introduced under desired pressure through opening 12 in mandrel 11 by means attached to threaded section 13 of said mandrel. It being understood of course that the opposite end of pipe 10 will be closed by suitable means such as another of my stoppers which has been provided with a cap screwed onto its threaded extremity 13.

Upon unscrewing nut 27 and urging mandrel 11 inwardly of the pipe 10, the slips 19 will be free to retract from engagement with the pipe and springs 20 will urge and aid in such movement while retaining the slips in assembly about the mandrel for ready further manipulation. The urging inwardly of mandrel 11 carrying rubber element 18 therewith will relieve distorting pressure against sealing element 26. It might here be pointed out that as the pressure inside the pipe increases the parts of my invention so co-act as to increase the sealing effect between member 26 and the pipe and that slips 19 are engaged more rigidly and securely with the surface of the pipe.

Figure 3:
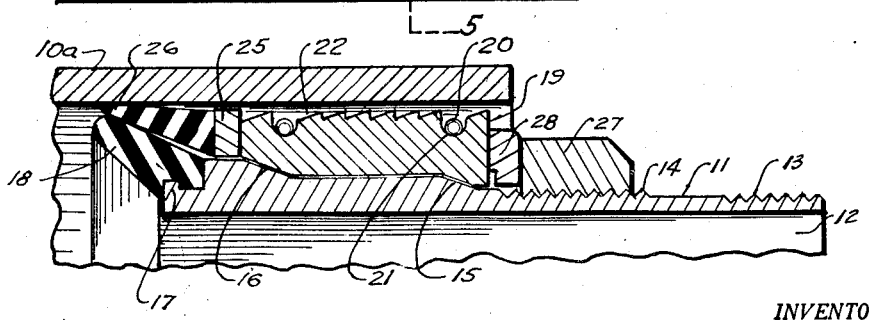
Figure 3 shows a modified form of Figure 1.

In Figure 3, pipe 10a is of the heavy wall or extra strong type in which the internal diameter of the pipe is smaller for a nominal size than of a standard or regular pipe of that size. In this situation, sealing element 26 and metal ring 25 will be correspondingly smaller on their outside diameters to allow the assembled stopper to be slipped easily into the smaller internal diameter pipe. The slips will move outwardly to a lesser extent before engagement than is required in the regular pipe of Figures 1, 2, 4 and 5. Other adjustments, manipulations, etc., are the same in either case.

Sealing element 26 may for convenience be bonded to ring 25 or the parts may be utilized in unattached form. Likewise element 18 may be bonded to mandrel 11 or may be molded with an internal flange to be received by a ring groove in mandrel 11. Also element 18 may be of harder rubber than seal 26 to facilitate the more ready distortion of the latter outwardly into better sealing engagement with pipe 10. Springs 20 might be replaced by strong elastic rubber bands. Member 18 may also be a conically shaped portion of mandrel 11.

All other modifications are intended to be included in the invention as fall within the scope of the following claims.

What I claim is:

1. A stopper for plugging the bore of a pipe, comprising a mandrel member threaded at its outer end, outwardly flared at its inner end and having at least one conical external intermediate surface enlarging toward said flared inner end; a plurality of slips disposed around said intermediate surface and having inner surfaces complementary in shape to said external surface; contractile means surrounding said slips and maintaining them in contact with said external surface; an annular resilient sealing member surrounding said mandrel member between the slips and said flared end; and nut means on said threaded end and engaging the adjacent ends of said slips, whereby when the nut means is tightened the slips and sealing member will be confined between the nut means and the flared end, said external surface expanding the slips and the flared end expanding the sealing member to engage the bore of the pipe.

2. In a stopper as set forth in claim 1, said mandrel member having a central bore therethrough communicating with the bore of said pipe.

3. In a stopper as set forth in claim 1, the flared end of the mandrel member comprising a rubber cone attached to said inner end.

4. In a stopper as set forth in claim 1, said external intermediate surface comprising two short conical portions separated by an intermediate cylindrical portion.

5. In a stopper as set forth in claim 1, said sealing member comprising a cylinder of rubber having a conical bore therethrough, the diameter and shape of the bore approximating the flare on the inner end of said mandrel member.

6. In a stopper as set forth in claim 5, a metal bearing ring between said sealing member and said slips and bonded to the sealing member.

References Cited in the file of this patent

UNITED STATES PATENTS

| | | |
|---|---|---|
| 1,822,444 | MacClatchie | Sept. 8, 1931 |
| 2,107,315 | Wainwright | Feb. 8, 1938 |
| 2,590,860 | Hoebeke | Apr. 1, 1952 |

FOREIGN PATENTS

| | | |
|---|---|---|
| 84,563 | Sweden | Oct. 8, 1935 |